(12) United States Patent
Thomas

(10) Patent No.: US 7,261,446 B2
(45) Date of Patent: Aug. 28, 2007

(54) LIGHT ASSEMBLY FOR A VEHICLE

(75) Inventor: Bud Thomas, 2881 N. LeCompte, Springfield, MO (US) 65803

(73) Assignee: Bud Thomas, Springfield, MO (US)

( * ) Notice: Subject to any disclaimer, the term of this patent is extended or adjusted under 35 U.S.C. 154(b) by 184 days.

(21) Appl. No.: 11/031,264

(22) Filed: Jan. 7, 2005

(65) Prior Publication Data

US 2006/0152936 A1  Jul. 13, 2006

(51) Int. Cl.
*B60Q 1/076* (2006.01)
(52) U.S. Cl. .................. 362/459; 362/479; 362/496
(58) Field of Classification Search ............... 362/459, 362/479–482, 484, 485, 486, 487–490, 493
See application file for complete search history.

(56) References Cited

U.S. PATENT DOCUMENTS

| | | | | | |
|---|---|---|---|---|---|
| 4,426,028 | A | * | 1/1984 | Bott ........................... | 224/325 |
| 4,941,074 | A | * | 7/1990 | DeCosse et al. ............ | 362/511 |
| 5,573,327 | A | * | 11/1996 | Dealey et al. ............... | 362/485 |
| 5,868,491 | A | * | 2/1999 | Moore ......................... | 362/295 |
| 6,140,918 | A | * | 10/2000 | Green et al. ................. | 340/468 |
| 6,152,586 | A | * | 11/2000 | Dealey et al. ............... | 362/485 |
| 6,402,353 | B2 | * | 6/2002 | Dealey et al. ............... | 362/478 |
| 6,974,238 | B2 | * | 12/2005 | Sturt et al. .................. | 362/488 |
| 7,104,675 | B2 | * | 9/2006 | Chen .......................... | 362/490 |
| 2004/0169390 | A1 | * | 9/2004 | Tiesler et al. ............... | 296/37.8 |

* cited by examiner

*Primary Examiner*—Sandra O'Shea
*Assistant Examiner*—Anabel Ton
(74) *Attorney, Agent, or Firm*—Harness, Dickey & Pierce, P.L.C.

(57) ABSTRACT

A light fixture assembly for the interior of a vehicle comprises a mounting member having a tab and a recessed cavity disposed on generally opposed end portions, and at least two spaced apart openings adapted to receive fasteners for securing the mounting member to the interior of a vehicle. The light fixture further comprises a light assembly housing having a recessed area in the back of the housing for receiving the mounting member, a retaining rib defining a space for receiving and retaining the tab of the mounting member, and an opening adapted to receive a fastener for engaging the recessed cavity of the mounting member to secure the light assembly housing to the mounting member.

22 Claims, 2 Drawing Sheets

US 7,261,446 B2

LIGHT ASSEMBLY FOR A VEHICLE

FIELD OF THE INVENTION

This invention relates to light fixture assemblies, and more particularly to light fixture assemblies for the interior or exterior of a motor vehicle.

BACKGROUND OF THE INVENTION

Lighting devices are often positioned on both exterior and interior areas of a motor vehicle to provide for interior lighting and lighting in the region of the doors in order to enhance visibility during the process of entry. The vast majority of incandescent lamps used for these purposes have the disadvantage of high incandescent-coil temperatures concentrated in one place. The high thermal losses, and the small size of the incandescent lamps give rise to reduced life of such lighting devices. Replacement of these lamps is also inconvenient, since the lighting device has to be opened each time the incandescent lamp burns out. This problem is also coupled with the difficultly of installing a lighting device in a desired location where there is not requisite space available for mounting of the lighting device. Even light emitting diode fixtures may difficult to install in a desired location where space is limited or the location of an electrical power connection limits the placement and installation position of the lighting device on the vehicle.

SUMMARY OF THE INVENTION

The present invention relates to a light fixture assembly that may be adjustably mounted on the exterior or within the interior of a motor vehicle. In one embodiment, a light fixture assembly for a motor vehicle comprises a mounting member having a tab and a recessed cavity disposed on generally opposed end portions, and at least two spaced apart openings adapted to receive fasteners for securing the mounting member to the interior of a vehicle. The mounting member further comprises a central opening for receiving at least two wires from an electrical source, where the opening allows for positioning of the light fixture relative to the location of the wires. The light fixture further comprises a light assembly housing having an aperture in the front of the housing for emitting light from a light source, a recessed area in the back of the housing for receiving the mounting member, a retaining rib defining a space for receiving and retaining the tab of the mounting member, and an opening adapted to receive a fastener for engaging the recessed cavity of the mounting member to secure the light assembly housing to the mounting member.

In accordance with one aspect of the present invention, some embodiments of a light assembly fixture are provided that comprise a mounting member having an opening of a predetermined width that allows for adjusting the mounting member relative to the location of an electrical power connection to position the light fixture in a desired location.

In accordance with another aspect of the present invention, some embodiments of a light assembly fixture are provided that comprise a mounting member having an opening of sufficient space for receiving a minimum length of wiring to allow for ergonomic connection of the wiring to the light fixture prior to installing the light fixture assembly.

Further aspects of the present invention will become apparent from the detailed description provided hereinafter. It should be understood that the detailed description and specific examples, while indicating various embodiments and methods of the invention, are for illustration purposes only and are not intended to limit the scope of the invention.

BRIEF DESCRIPTION OF THE DRAWINGS

Corresponding reference numerals indicate corresponding parts throughout the several views of the drawings.

DETAILED DESCRIPTION OF THE INVENTION

Figure 1:
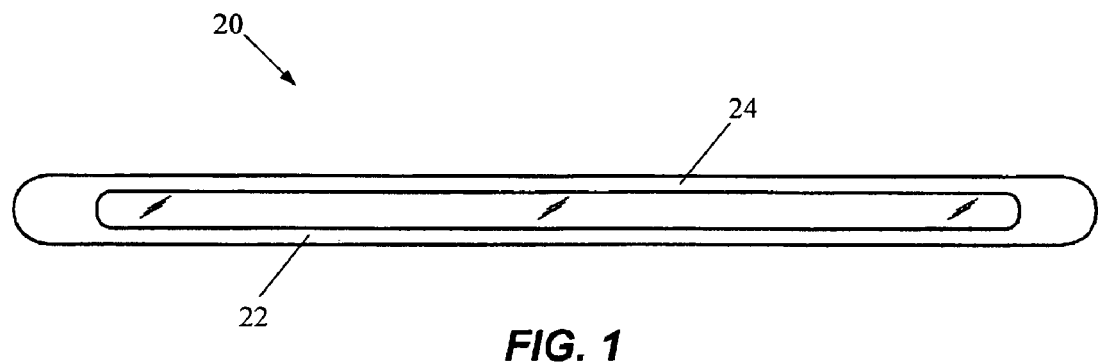
FIG. 1 is a top view of one embodiment of a light fixture housing in accordance with the principles of the present invention.
Figure 2:
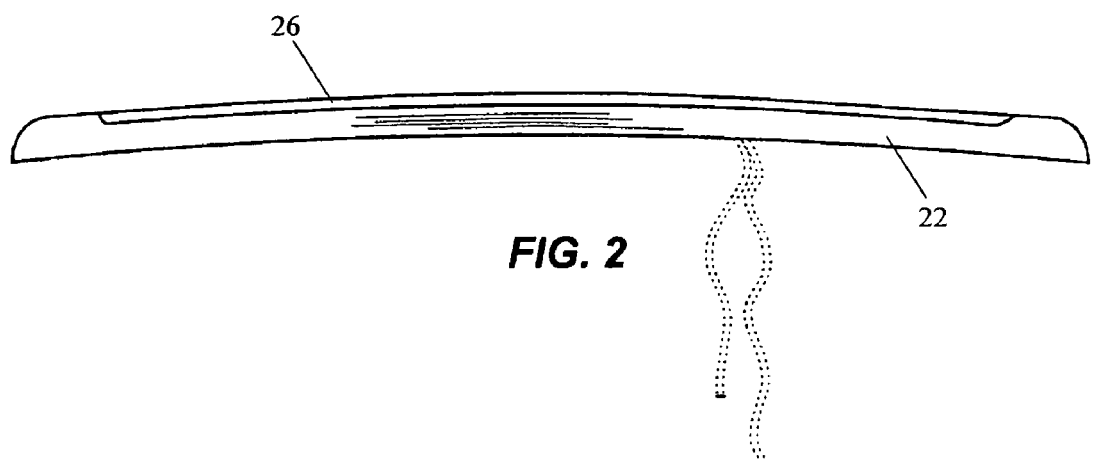
FIG. 2 is a side view of one embodiment of a light fixture housing.
Figure 3:
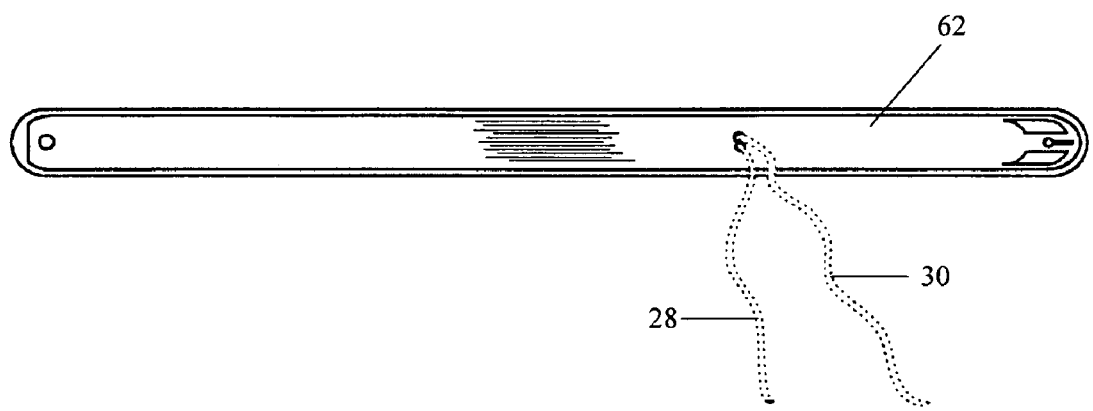
FIG. 3 is a bottom view of one embodiment of a light fixture housing.

One embodiment of a light fixture assembly according to the principles of the present invention is shown generally at 20 in FIG. 1. The light fixture assembly comprises a light fixture housing 22 having an aperture 24 in the front of the housing 22 for emitting light therethrough. In this embodiment, the light fixture housing 22 is generally curved in shape as shown in FIG. 2 to allow for installation on a curved surface. The light fixture housing 22 includes a light pipe 26, which receives light from a light source and disperses the light through the aperture 24 of the housing 22. The light source is preferably connected to an electrical power source through a pair of wires 28 and 30 extending out the back of the light fixture housing 22 as shown in FIG. 3.

Figure 4:
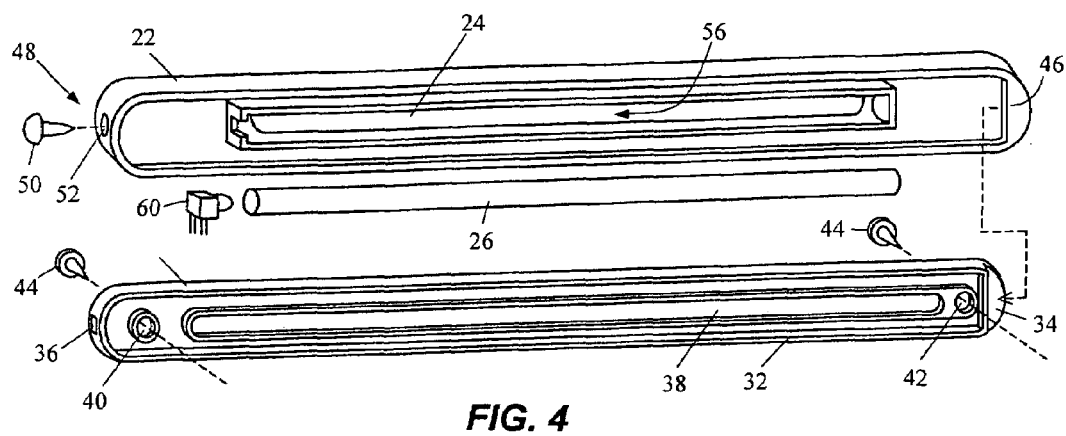
FIG. 4 is an assembly view of a second embodiment of a light fixture showing a mounting member for the light fixture in accordance with the principles of the present invention.
Figure 5:
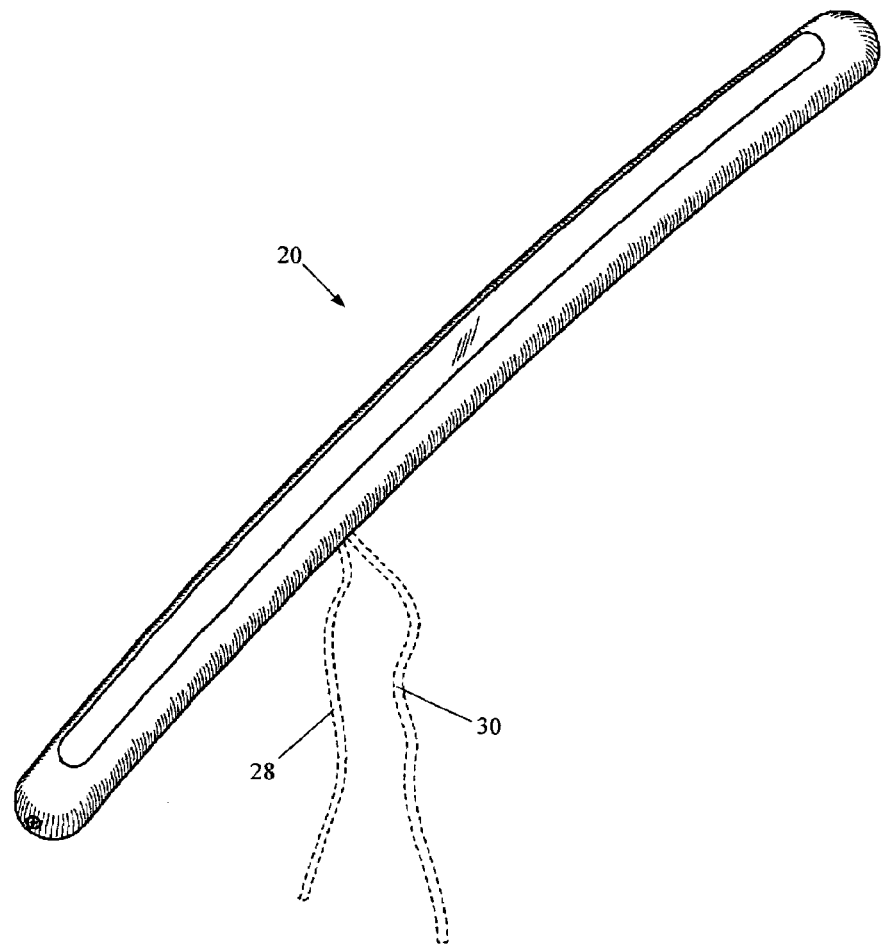
FIG. 5 is a perspective view of a light fixture housing in accordance with the principles of the present invention.

Referring to FIG. 4, a second embodiment of a light fixture housing 22 that is generally straight comprises a mounting member 32 that is installed on a motor vehicle for mounting the light fixture. The mounting member 32 comprises a protruding tab 34 and a recessed cavity 36 disposed on generally opposed end portions of the mounting member 32. The mounting member further includes a central opening 38 for receiving the at least two wires 28 and 30 for connecting to the electrical power source. The central opening 38 could alternatively receive two wires from an electrical power source, which could then be connected to wires 28 and 30 from the light fixture housing 22.

The central opening 38 of the mounting member 32 is of a predetermined width to allow for adjusting the position of the mounting member 32 over the location of the electrical power connection within the vehicle. The length of the opening 38 gives the installer the flexibility to adjust the position of the light fixture over the power connection to obtain a desired mounting location or position of the light fixture. Such a position could be above a door, or in a location with limited room for installation. In one embodiment, the predetermined length 38 is about eight to nine inches, but may be any alternative length suitable for providing sufficient freedom to position the light fixture in a desired location. The length of the opening 38 also provides sufficient space for receiving a minimum length of wiring to allow for ergonomic connection of wiring to the light fixture housing 22 prior to installing the light fixture housing. This allows the installer to insert a considerable length of wire (28 and 30) through the opening 38 in the mounting member 32 to connect to the electrical power source, after which the installer may tuck the length of wire within the opening 38 of the installed mounting member 32. Thus, the installer would be able to conveniently wire the light fixture and install the mounting member 32 in place without being constrained by either a minimal length of wire to work with or an insufficient space for receiving the wiring.

The mounting member 32 further comprises at least two spaced apart openings 40 and 42 adapted to receive fasteners 44 for securing the mounting member 32 to the interior or exterior of a vehicle. Once the light fixture has been positioned in a desired location, the mounting member 32 may be fastened to the vehicle via fasteners and drilled holes. In one embodiment, the fasteners are preferably screws, but may be any fastener suitable for installation within a vehicle. The mounting member 32 is flexible to accommodate installation on either a flat or a curved surface on a vehicle. Likewise, the light fixture housing 22 may be either curved in shape for installation against a curved surface, or may also be straight for mounting on a flat surface. The mounting member 32 may also further comprise a circumferential slot on the surface that engages the interior of the vehicle, where the slot is configured to receive a resilient compressible strip of material or an o-ring. The resilient strip of material or o-ring provides for improved resistance to moisture where the light fixture assembly may be used in locations on the exterior of the vehicle.

The light fixture housing 22 further comprises a retaining rib 46 near one end that defines a space for receiving and retaining the tab 34 of the mounting member 32, and also an engaging means 48 for engaging the recessed cavity 36 of the mounting member 32. The retaining rib 46 and the engaging means 48 are adapted to secure the light fixture housing 22 to the mounting member 32 in a manner that provides a simple, novel means of installation. In one embodiment, the retaining rib 46 of the light fixture housing 22 may be slid over the protruding tab 34 of the installed mounting member 32, and an engaging means 48 comprising a fastener 50 may be installed through an opening 52 to secure the light fixture housing 22 to the mounting member 32. Specifically, the engaging means 48 comprises an opening 52 adapted to receive the fastener 50, which threadably engages the recessed cavity 36 in the mounting member 32. In addition to the engaging means 48, the light fixture housing 22 further comprises a recessed area 54 that is adapted to receive the contoured profile of the mounting member 32 and to provide additional support of the light fixture housing 22.

In another embodiment, the fastener 50 may be threadably received in the opening 52 in the light fixture housing 22, and engages the recessed cavity 36 of the mounting member 32 to secure the light fixture housing 22. In yet another embodiment, the engaging means 48 may alternatively comprise a detent member (not shown) that protrudes inward and snaps into or engages the recessed cavity 36 of the mounting member 32, independent of the use of a fastener. It should be understood that various means may be used to engage the recessed cavity 36 of the mounting member 32 to secure the light fixture housing 22 to the mounting member 32.

The light fixture housing 22 further comprises a slot 56 within the housing 22 adjacent the aperture 24 for receiving a light pipe 26, where light transmitted to the light pipe 26 is emitted through the aperture 24. The light fixture assembly may additionally comprise a reflective strip 58 (not shown) placed on the back side of the light pipe 26 to enclose the light pipe 26 within the slot 56, and a light emitting diode 60 for emitting light into the light pipe 26. The light emitting diode 60 is in connection with the at least two wires 28 and 30 connected to an electrical power source. As shown in FIG. 3, the light fixture may additionally comprise a backing plate 62 configured to retain the light emitting diode 60, light pipe 26, and reflective strip 58 within the light fixture housing 22. The backing plate also provides for securing the at least two wires 28 and 30, which may be ergonomically installed through the opening of the mounting member.

The advantages of the above described embodiment and improvements should be readily apparent to one skilled in the art, as to enabling convenient installation of a light fixture assembly in a motor vehicle. Additional design considerations may be incorporated without departing from the spirit and scope of the invention. Accordingly, it is not intended that the invention be limited by the particular embodiment or form described above, but by the appended claims.

What is claimed is:

1. A light fixture for the interior or exterior of a vehicle comprising:
a mounting member having a tab disposed on one end portion and a cavity disposed on a generally opposite end portion, the mounting member including at least two spaced apart openings adapted to receive fasteners for securing the mounting member to the vehicle, and a central opening for receiving at least two wires from an electrical power source, wherein the central opening is of a predetermined width to allow for adjusting the mounting member over the vehicle power wires to position the light fixture in a desired location; and
a light fixture housing comprising:
an aperture in the front of the housing for emitting light therethrough;
a slot adjacent the aperture within the light fixture housing for receiving a light pipe;
a light pipe disposed within the slot in the light fixture housing;
a reflective strip enclosing the light pipe within the slot;
a light emitting diode in connection with the at least two wires from an electrical power source, wherein the emitted light from the diode is transmitted into the light pipe and dispersed through the aperture;
a backing plate configured to retain the light emitting diode, light pipe and reflective strip within the light fixture housing;
a recessed cavity in the back of the light fixture housing adapted to fit over the mounting member;
a retaining rib in one end of the light fixture housing defining a space for receiving and retaining the tab disposed on one end portion of the mounting member;
an opening in an opposite end of the light fixture housing adapted to receive a fastener for threadably engaging the cavity in the generally opposite end portion of the mounting member to secure the light housing to the mounting member.

2. The light fixture of claim 1 wherein the central opening of the mounting base includes a sufficient space therein for receiving a minimum length of wiring to allow for ergonomic connection of the light fixture prior to installing the light fixture housing.

3. The light fixture of claim 2 wherein the mounting member further comprises a contoured profile, and the light fixture housing further comprises a recessed cavity for receiving the contoured profile of the mounting member.

4. The light fixture of claim 3 wherein the light fixture housing is configured to be installed on a generally curved surface.

5. The light fixture of claim 4 wherein the mounting member further comprises a circumferential slot on the surface that engages the interior of the vehicle, the slot being configured to receive a resilient compressible o-ring.

6. A light fixture assembly for the interior or exterior of a vehicle comprising:
   a mounting member having a contoured profile, a tab and a recessed cavity disposed on generally opposed end portions, the mounting member including at least two spaced apart openings therein for receiving fasteners to secure the mounting member to the vehicle; and
   a light assembly housing having a central aperture for emitting light from a light source, a slot within the light assembly housing adjacent the aperture for receiving a light source therein; a recess for receiving the contoured profile of the mounting member, a retaining rib defining a space for receiving and retaining the tab of the mounting member, and an engaging means for engaging the recessed cavity of the mounting member to secure the light assembly housing to the mounting member.

7. The light fixture of claim 6 wherein the engaging means of the light fixture housing comprises a projecting member that fits into and engages the recessed cavity of the mounting member.

8. The light fixture of claim 6 wherein the spaced apart openings of the mounting member are adapted to receive fasteners for securing the mounting member to the interior of a vehicle.

9. A light fixture assembly for the interior or exterior of a vehicle comprising:
   a mounting member having a tab and a recessed cavity disposed on generally opposed end portions, the mounting member including at least two spaced apart openings therein adapted to receive fasteners to secure the mounting member to the interior of a vehicle; and
   a light fixture housing having a central aperture for emitting light from a light source, a retaining rib defining a space for receiving and retaining the tab of the mounting member, and an engaging means for engaging the recessed cavity of the mounting member to secure the light fixture housing to the mounting member,
   wherein the mounting member further comprises a contoured profile, and the light fixture housing further comprises a recessed cavity for receiving the contoured profile of the mounting member.

10. The light fixture of claim 9 wherein the engaging means comprises an opening in the housing adapted to receive a fastener that threadably engages the recessed cavity of the mounting member to secure the light fixture housing to the mounting member.

11. The light fixture of claim 6 wherein the mounting member further comprises electrical connectors integral to the mounting member for establishing electrical connection through the mounting member to the light fixture when the light fixture housing is installed onto the mounting member.

12. The light fixture of claim 6 wherein the mounting member further comprises a central opening for permitting passage of an electrical power connection for a light fixture therethrough.

13. A light fixture assembly for the interior or exterior of a vehicle comprising:
   a mounting member having a tab and a recessed cavity disposed on generally opposed end portions, the mounting member including at least two spaced apart openings therein adapted to receive fasteners to secure the mounting member to the interior of a vehicle, and a central opening for permitting passage of an electrical power connection for a light fixture therethrough; and
   a light assembly housing having a central aperture for emitting light from a light source, a retaining rib defining a space for receiving and retaining the tab of the mounting member, and an engaging means for engaging the recessed cavity of the mounting member to secure the light fixture housing to the mounting member; wherein the housing further comprises a slot within the housing adjacent the aperture for receiving a light pipe.

14. The light fixture of claim 13, further comprising a light emitting diode in connection with the at least two wires from an electrical power source, wherein the emitted light is transmitted into the light pipe and dispersed through the aperture.

15. The light fixture of claim 14 further comprising a backing plate configured to retain the light emitting diode and light pipe within the housing.

16. The light fixture of claim 15 wherein the electrical power connection comprises at least two wires and the central opening of the mounting base provides sufficient space for receiving a minimum length of wiring to allow for ergonomic connection of the light fixture prior to installing the light fixture.

17. A light fixture assembly for the interior or exterior of a vehicle comprising:
   a mounting member having a tab and a recessed cavity disposed on generally opposed end portions, the mounting member including a central opening and at least two spaced apart openings adapted to receive fasteners for securing the mounting member to the interior of a vehicle; and
   a light assembly housing having an aperture in the front of the housing for emitting light from a light source, a recessed area in the back of the housing for receiving the mounting member, a retaining rib defining a space for receiving and retaining the tab of the mounting member, and an opening adapted to receive a fastener for engaging the recessed cavity of the mounting member to secure the light assembly housing to the mounting member.

18. The light fixture of claim 17 wherein the opening in the light fixture housing is adapted to threadably receive a fastener that engages the recessed cavity in the mounting member to secure the housing to the mounting member.

19. The light fixture of claim 17 wherein the opening in the light fixture housing is adapted to receive a fastener that threadably engages the recessed cavity in the mounting member to secure the housing to the mounting member.

20. The light fixture of claim 19 wherein the electrical power connection comprises at least two wires and the central opening of the mounting base provides sufficient space for receiving a minimum length of wiring to allow for ergonomic connection of the light fixture prior to installing the light fixture.

21. The light fixture of claim 20 wherein the housing further comprises a slot within the housing adjacent the aperture for receiving a light pipe.

22. The light fixture of claim 21, further comprising a light emitting diode in connection with the at least two wires from an electrical power source, wherein the emitted light is transmitted into the light pipe and dispersed through the aperture.

* * * * *